July 7, 1953 — R. E. RUSSELL — 2,644,543
WASTE FITTING
Filed Aug. 12, 1949

Inventor:
Robert E. Russell
By Lee J. Gary
Attorney

Patented July 7, 1953

2,644,543

UNITED STATES PATENT OFFICE 2,644,543

WASTE FITTING

Robert E. Russell, Kenosha, Wis., assignor to Frost Company, Kenosha, Wis., a corporation of Wisconsin Application August 12, 1949, Serial No. 109,857

2 Claims. (Cl. 182—18)

This invention relates to improvements in a waste connection for twin sinks and refers particularly to a waste connection, the component parts of which may be adjusted to meet a large number of conditions of space relationships met with in practice.

In accommodating twin sinks to available space in a building many problems of space relationship of essential connections are encountered. The essential connections referred to are the connections between the waste fitting and the main drain pipe and the waste fitting and the sink drains. The variety of space relationships of these connections are numerous and in most instances the position of these connections is constant and cannot be altered with respect to each other which requires that the waste fitting must be accommodated to the given fixed space relationship of the main drain and sink drains.

In addition, the drain fitting frequently has to be accommodated to other fixed obstructions positioned under the sinks which further complicates the problem.

This problem not only vexes the plumber who must install the sinks, but also requires that plumbing suppliers carry in stock numerous separate drain fittings with which the plumber may solve his installation problem, and in many instances standard fittings cannot be employed. This, of course, increases the cost of installation to the user, since excessive installation time by the plumber is frequently necessary and the unit cost of a large number of separate fittings carried in stock by the supplier is necessarily higher than if a standard fitting could be employed to solve the installation problem.

The present invention is directed to a waste fitting which will accommodate itself to most of the space relationship problems met with in practice, and is characterized by the numerous different positions the essential drain connections can be made to assume with respect to each other.

Other objects and advantages of the present invention will be apparent from the accompanying drawing and following detailed description.

Figure 1:
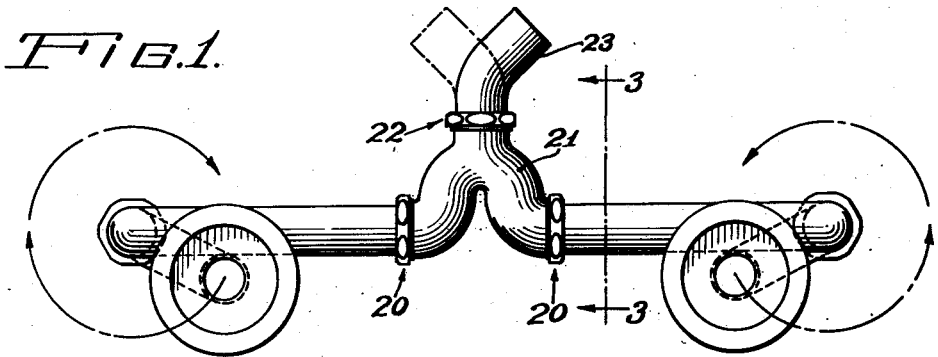
Fig. 1 is a top plan view of the waste fitting comprising the concepts of the present invention.
Figure 2:
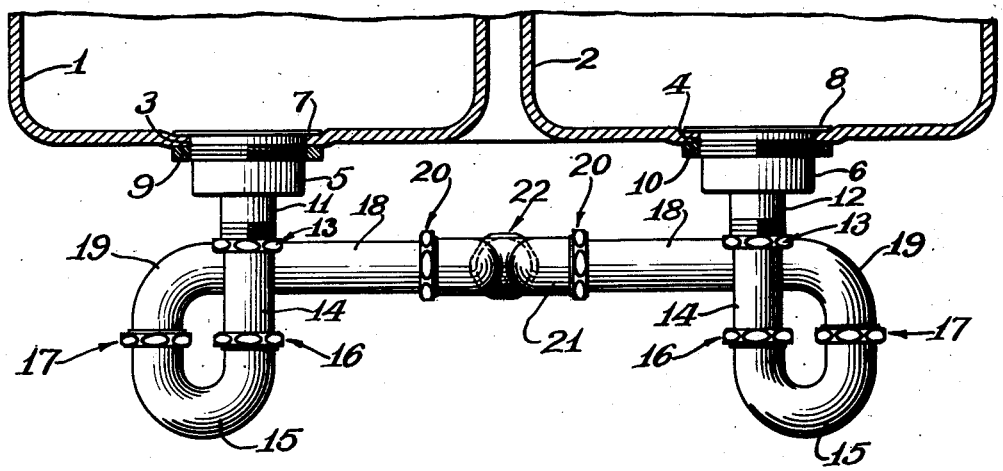
Fig. 2 is a front elevational view of the fitting, the twin sinks being shown in section.

Referring in detail to the drawing, the numerals 1 and 2 indicate the lower portions of two sinks each of which has a drain opening 3 and 4, respectively, in its bottom. As is common practice, cups 5 and 6 are respectively positioned in the openings 3 and 4, said cups being of conventional construction having flanges 7 and 8 which engage the face of the sink bottoms and being secured thereto by threaded rings or nuts 9 and 10, respectively.

Each of the cups 5 and 6 connects into a nipple 11 and 12 respectively which latter are connected by means of flat flange joints 13 to pipes 14. At the opposite end of each of the pipes 14 a U-shaped trap 15 is connected by means of a rubber slip joint 16 and the opposite ends of the U-shaped traps are connected, by means of swivel rubber union joints 17 to pipes 18, one end of each of the latter having a right-angle bend 19. The opopsite ends of the pipes 18 are connected by companion metal compression swivel joints 20 to two arms of a Y-fitting 21, the common arm of which is connected by means of a companion metal compression swivel joint 22 to a pipe 23 which is bent at a 45° angle to itself intermediate its length. The opposite end of the pipe 23 is connected in a conventional manner to the main drain or waste pipe (not shown) which is usually carried in the building wall.

The swivel joints 13, 16, 17 and 20 are conventional joints which permit a swivelling movement of the joined members. It can readily be seen that the arrangement hereinbefore described will permit a large variety of differently spaced conections to be made.

For example, the sinks 1 and 2 may be separate and may be more or less spaced from each other, or if the sinks constitute an integral unit, the drain openings 3 and 4 may be spaced differently for different sink units. By virtue of the swivel joints 16 and 17 the U-shaped traps 15 may be rotated well over 270° with respect to the centerlines of pipes 18, as shown best in Fig. 1, and, hence, the fitting may be accommodated to a wide variety of spacings between the centers of the drain openings 3 and 4.

By rotating the U-shaped members the same degree on the same side of pipes 18 the centerline of pipes 18 will be disposed parallel to the line joining the centers of drain openings 3 and 4. However, by rotating the U-shaped members different degrees on the same side of pipes 18 or the same or different degrees upon opposite sides of the pipes 18, the centerline of pipes 18 may be made to assume a large variety of angles with respect to the line joining the centers of the drain openings. Thus, the centerline of the pipes 18 may be disposed parallel to the wall and the drain openings 3 and 4 may be spaced different distances from the wall or, the line joining the centers of the drain openings may be parallel to the wall and the centerline of the pipe 18 may assume a wide variety of angles with respect to the wall. Of course, the pipe 23 may be formed with a 45° angle, as shown, or said pipe may be straight. The pipe 23, either angled or straight, may be of any length desired.

Figure 3:
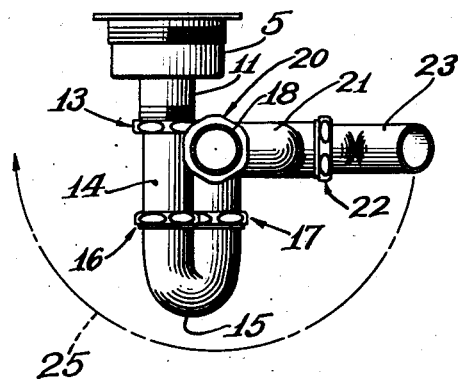
Fig. 3 is a transverse sectional view of the fitting taken on line 3—3 of Fig. 1.

By virtue of the swivel metal compression joints 20 the pipe 23 and Y 21 can be swung through an angle of 180°, as indicated by the circular arrow 25 in Fig. 3. By this provision the pipe 23 can be connected to a main drain or waste pipe which is positioned either vertically or at a large variety or other angles in a vertical plane.

In general the present invention takes into consideration three variable space relationships, that is, the space relationship of drain opening 3 with respect to drain opening 4 and the space relationship of the end of pipe 23, that is, its point of connection into the main drain or waste pipe, and drain opening 3 and drain opening 4. By the provision of the swivel joints 13, 16, 17, 20 and 22, numerous different positionings of these three critical connections can be accommodated.

The fitting comprising the present invention may be maintained in stock by a plumbing supplier as a standard fitting which will supply the plumber with a solution to substantially all of the difficult connection problems in connecting twin sinks. A large inventory of different fittings for the connection of twin sinks is thus rendered unnecessary and the unit cost of such fitting is thereby reduced, thereby reducing the cost to the ultimate user and yet satisfying his convenience by being able to locate the sinks where he desires substantially regardless of the peculiarities of his basic plumbing arrangement and the room or wall layout of his house or building.

I claim as my invention:

1. A waste fitting for twin receptacles each having a drain opening facing substantially vertically upwardly, which comprises in combination a Y fitting having three openings facing in three different directions, at least two of said openings facing in a direction at substantially right angles to the direction faced by the drain openings, a drain assembly connected to each of said receptacles, a swivel joint connecting each drain assembly to an arm of said Y fitting, each drain assembly comprising a U-shaped trap, a tubular pipe connecting each of said joints to said U-shaped trap, and means comprising a coupling pipe connecting each of said U-shaped traps to one of said receptacles, and swivel joints connecting both ends of said U-shaped trap respectively to said tubular pipe and coupling pipe, a pipe connecting the third arm of the Y fitting to a main drain pipe, and a swivel connection joining said last mentioned pipe and the third arm of said Y fitting.

2. A waste fitting for twin receptacles having drain openings in substantially the same horizontal plane, said fitting comprising in combination a Y fitting having three openings facing in three different directions and the center of at least two of which are in the same horizontal plane, a drain assembly connected to each of said receptacles, a swivel joint connecting each drain assembly to an arm of said Y fitting whereby said Y fitting is rotatable with respect to said drain assemblies, each drain assembly comprising a U-shaped trap, a tubular pipe connecting each of said joints to one of said U-shaped traps and means comprising a coupling pipe connecting each of said U-shaped traps to one of said receptacles, swivel joints connecting both ends of each of said U-shaped traps respectively to said tubular pipes and coupling pipes whereby said U-shaped traps are rotatable with respect to said coupling pipes, a pipe connecting the third arm of the Y fitting to a main drain pipe and a swivel connection joining said last mentioned pipe and the third arm of said Y fitting whereby said last mentioned pipe is rotatable with respect to said Y fitting.

ROBERT E. RUSSELL.

References Cited in the file of this patent

UNITED STATES PATENTS

| Number | Name | Date |
|---|---|---|
| 922,312 | Murphy | May 18, 1909 |
| 1,678,783 | Oakley | July 31, 1928 |
| 2,302,617 | Little | Nov. 17, 1942 |